United States Patent
Daremas et al.

(10) Patent No.: US 8,614,029 B2
(45) Date of Patent: Dec. 24, 2013

(54) PLANT WITH HIGH-TEMPERATURE FUEL CELLS AND A MULTI-COMPONENT SLEEVE FOR A CELL STACK

(75) Inventors: Konstantin Daremas, Räterschen-Schottikon (CH); Thomas Zaehringer, Winterthur (CH)

(73) Assignee: Sulzer Hexis AG, Winterthur (CH)

( * ) Notice: Subject to any disclaimer, the term of this patent is extended or adjusted under 35 U.S.C. 154(b) by 859 days.

(21) Appl. No.: 11/886,807

(22) PCT Filed: Feb. 14, 2006

(86) PCT No.: PCT/CH2006/000095
§ 371 (c)(1),
(2), (4) Date: Jun. 26, 2009

(87) PCT Pub. No.: WO2006/099756
PCT Pub. Date: Sep. 28, 2006

(65) Prior Publication Data
US 2009/0286117 A1    Nov. 19, 2009

(30) Foreign Application Priority Data

Mar. 21, 2005  (EP) .................................... 05405252

(51) Int. Cl.
*H01M 8/04* (2006.01)
*H01M 2/08* (2006.01)
(52) U.S. Cl.
USPC ............ 429/509; 429/508; 429/511; 429/440
(58) Field of Classification Search
USPC .................................... 429/44, 440, 507–511
See application file for complete search history.

(56) References Cited

U.S. PATENT DOCUMENTS

| | | | | |
|---|---|---|---|---|
| 4,738,905 A | * | 4/1988 | Collins | 429/460 |
| 6,461,756 B1 | * | 10/2002 | Blanchet et al. | 429/460 |
| 2001/0009732 A1 | * | 7/2001 | Schuler | 429/19 |
| 2004/0043267 A1 | * | 3/2004 | Schuler et al. | 429/26 |
| 2006/0042054 A1 | * | 3/2006 | Kippes et al. | 24/458 |

FOREIGN PATENT DOCUMENTS

| | | |
|---|---|---|
| EP | 1 037 296 A1 | 9/2000 |
| EP | 1 347 529 A2 | 9/2003 |

* cited by examiner

*Primary Examiner* — Raymond Alejandro
*Assistant Examiner* — Helen McDermott
(74) *Attorney, Agent, or Firm* — Kilpatrick Townsend & Stockton LLP

(57) ABSTRACT

The plant with high temperature fuel cells includes a multi component sleeve for a cell stack. Axially directed chambers for an afterburning process are arranged between the periphery of the stack and an outer region of the sleeve. A construction which fixes the chambers includes a corset-like cage, the cross-section of which perpendicular to the stack axis has essentially the shape of a regular polygon. An afterburning chamber is associated with each corner of this polygon. Radial spring forces respectively act from the corners onto the associated chamber and thereby press sealing edges of the chamber onto sealing strips between chamber and stack. The sealing edges form a closed edge of a trough-like space. The trough-like space is connected via a narrow passage with an axial collection passage for exhaust gas. This collecting passage is arranged between the trough-like space and the corner.

10 Claims, 4 Drawing Sheets

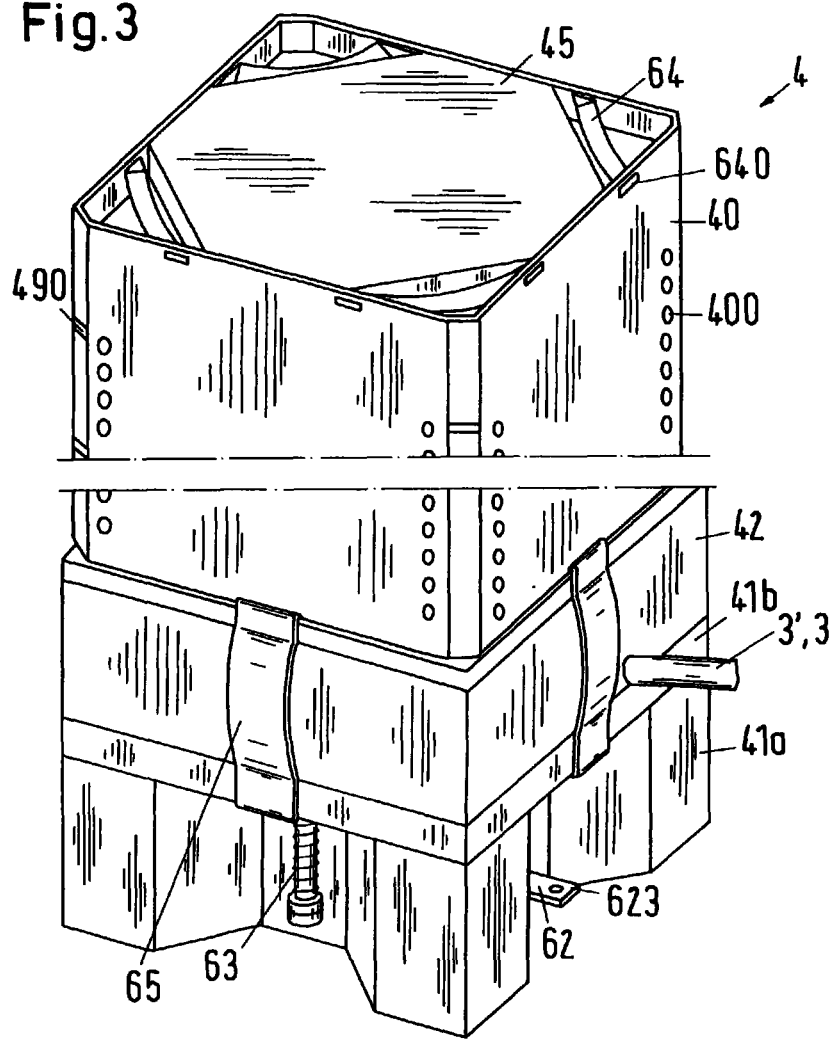
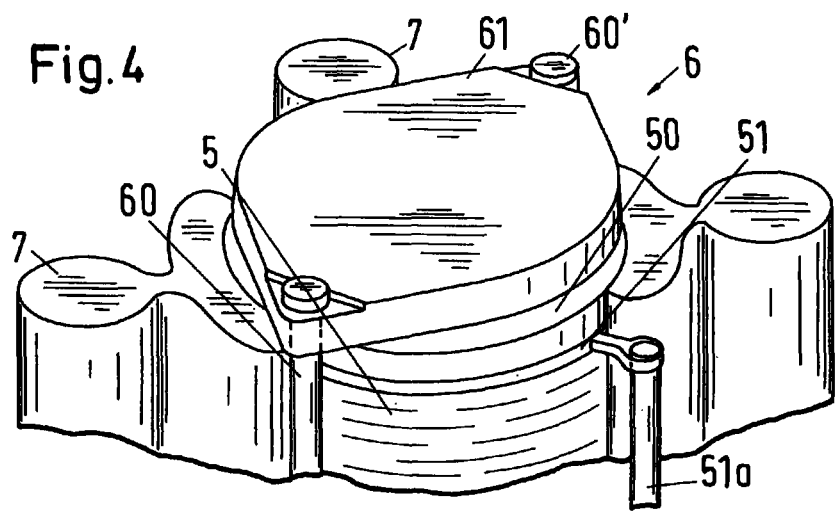

PLANT WITH HIGH-TEMPERATURE FUEL CELLS AND A MULTI-COMPONENT SLEEVE FOR A CELL STACK

CROSS-REFERENCE TO RELATED APPLICATIONS

This application is a U.S. National Phase Application of PCT/CH2006/000095, filed Feb. 14, 2006, which claims the benefit of European application number 05405252.7, filed Mar. 21, 2005, the disclosures of both of which are incorporated in their entirety by reference.

BACKGROUND OF THE INVENTION

The invention relates to a plant with high-temperature fuel cells and a multi-component sleeve for a cell stack which includes axially directed chambers for an afterburning process.

A plant of this kind includes a fuel cell battery such as is known from EP 1 037 296 A1. The fuel cells form a cylindrical cell stack with afterburning being carried out at the periphery of the cell stack in axially directed chambers, with exhaust gas at around 1000° C. arising. Entry points are present between the afterburning chambers through which the pre-heated process air is supplied to the cells for power delivering electro-chemical reactions. A fuel gas is distributed to the cells via an axial passage at the center of the stack.

Each fuel cell includes two parts, namely a PEN element and a disc-like interconnector. The PEN element which consists of at least three layers, namely P (cathode, i.e. positive electrode), E (electrolyte) and N (anode), is an electro-chemically active element with which electro-chemical reactions can be carried out at 700-900° C. The PEN element has the form of a thin circular disc which consists of a layer-like solid electrolyte and two electrodes P and N respectively applied by coating. The disc-like interconnector separates a space for the air from a space for the fuel gas. It has an architecture with a relief-like profile by which a flow of the fuel gas from a central entry point along the PEN element to the periphery is made possible, on the one hand. The flow of the air, on the other hand, is directed by the architecture of the interconnector from entry points into a central region and from there along the PEN element back to the periphery. At the periphery of the cell stack there are discretely arranged openings for the entry and exit of the air and fuel gas, respectively.

The afterburning chambers are surrounded by layers or shells of heat insulating material which, together with the chambers, forms a multi-component sleeve of the cell stack. A reformer is arranged within the sleeve and directly below the cell stack in which the fuel gas is catalytically converted at least partly into CO and $H_2$. In this connection oxygen (air) is mixed with the fuel gas so that a partial oxidation results. The generation of CO and $H_2$ is made possible by the partial oxidation and the heat delivered for the endothermic reactions.

The multi-component sleeve is formed as a heat insulating system. Its heat insulating function plays the role of an external recuperator. Instead of the air required in the cells for the electro-chemical processes first having to be preheated in a separate external recuperator, the air, which is initially cold or only slightly preheated, is used as a heat sink, in that the heat flowing away from the cell stack is partly taken up by the air in the sleeve and is returned again to the reaction sites.

The sleeve is of multilayer construction and has a passage system for the air flow. Between an outer wall which forms a first layer or shell of the sleeve and the inner components of the sleeve there is a first hollow space in which a distribution and a heating of the air, i.e. a cooling of the sleeve, takes place. In the passage system which follows the first hollow space a further heating of the air results. Instead of or in addition to the passages, porous gas permeable parts can also be incorporated in the sleeve which form a dynamic thermal insulation. The air which flows through the pores of the thermal insulation in the radial direction takes up heat which is transmitted from the cell stack principally by thermal radiation and is absorbed by the material of the thermal insulation. The heat taken up is transported by the air back into the cell stack.

The afterburning chambers are formed as axially directed collecting channels through which the exhaust gas is led. The exhaust gas, which is sucked away, flows out of the chambers radially outwardly and subsequently flows on axially. Prior to the passage from the sleeve into the cell stack, the air is heated up further at the outer walls of the afterburning chambers by the heat given up by the exhaust gas which is flowing axially in the chamber, the heat corresponding to the heat arising during the afterburning and part of the heat liberated during the electro-chemical reactions.

The fuel cell battery is used in a plant which is part of a building infra-structure, with the energy converted by the fuel cells being utilized in the form of thermal energy (e.g., for heating purposes) and of electrical energy.

A disadvantage of the known plant with the fuel cell battery is that exhaust gas flowing axially into the afterburning chambers leads to unfavourable temperature gradients in the direction of the stack axis. Moreover, a seal between the stack and the chamber walls is problematic. This problem is a design problem which is associated with differing thermal expansion behavior of the components.

BRIEF SUMMARY OF THE INVENTION

There is an unmet need for a plant with high temperature fuel cells and a multi-component sleeve for a cell stack which is better designed with respect to the named disadvantages.

The plant with high temperature fuel cells includes a multi component sleeve for a cell stack. Axially directed chambers for an afterburning process are arranged between the periphery of the stack and an outer region of the sleeve. A construction which fixes the chambers includes a corset-like cage, the cross-section of which perpendicular to the stack axis has essentially the shape of a regular polygon. An afterburning chamber is associated with each corner of this polygon. Radial spring forces respectively act from the corners on the associated chamber and thereby press sealing edges of the chamber onto sealing strips between the chamber and the stack. The sealing edges form a closed edge of a trough-like space. The trough-like space is connected via a narrow passage with an axial collection passage for exhaust gas. This collection passage is arranged between the trough-like space and the corner.

Further advantages as provided by embodiments of the invention are described below.

BRIEF DESCRIPTION OF THE DRAWINGS

FIG. 3 shows a part of the multi-component sleeve, the outer wall of which forms a corset-like cage.

FIG. 4 shows an upper end of the clamping device for the cell stack.

DETAILED DESCRIPTION OF THE INVENTION

Figure 1:
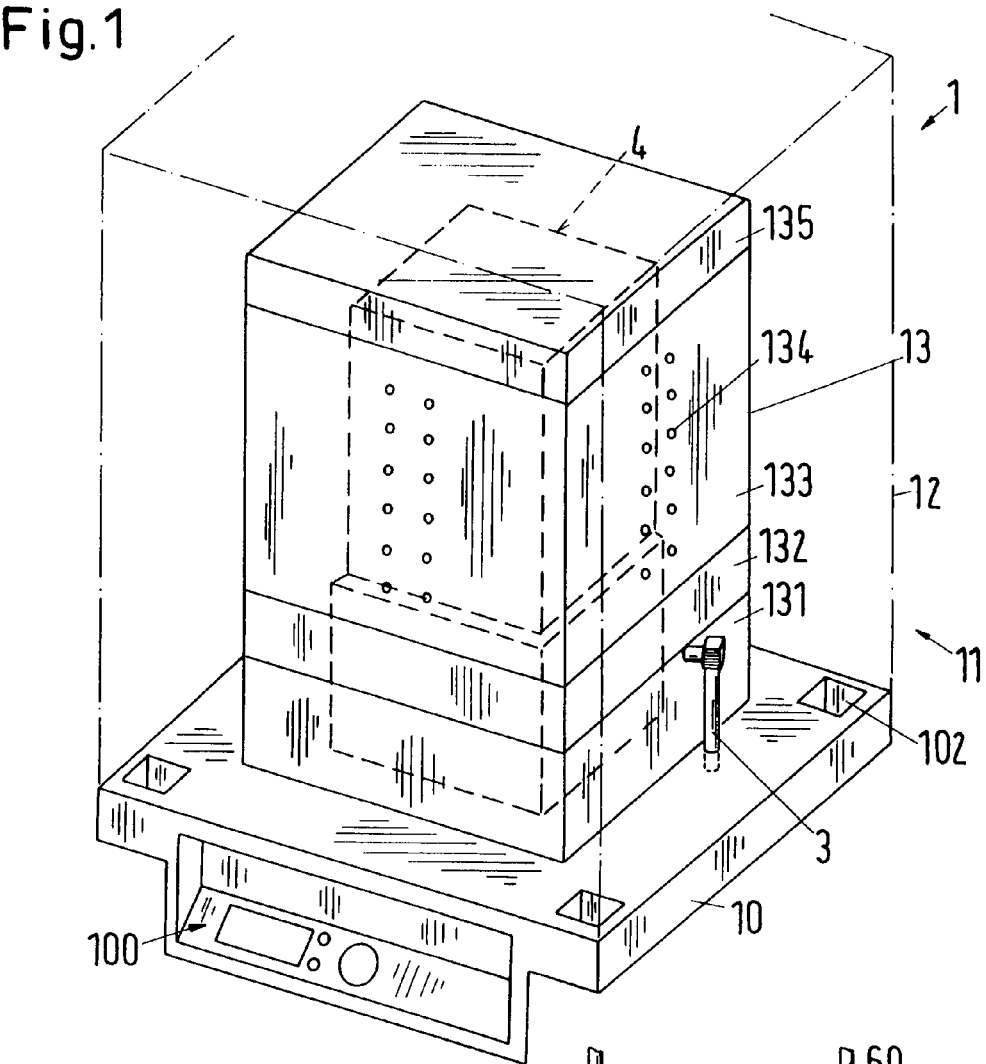
FIG. 1 is an overview of the outer parts of a multi-component sleeve which screens a cell stack of the plant of the invention.

As seen in FIG. 1, an upper part of the plant 1 in accordance with the invention is a fuel cell battery 11 which consists of a cell stack 5 (see FIG. 4) and a multi-component sleeve. The sleeve which screens off the cell stack 5 relative to the environment is secured to a table 10 which forms the upper termination of the lower part of the plant 1 and carries the operating elements 100. The multi-component sleeve is in part similarly constructed to a Russian "Matrjoschka" box puppet. An outer sleeve part 12 (indicated by chain-dotted lines) of heat insulating material, which is exposed in normal operation of the plant 1 only to temperatures below about 60° C., encloses an inner heat insulating sleeve part 13 which forms a hollow space (not shown) with the inner side of the outer sleeve part 12. Preheated air (i.e. process air) enters into corners of the table 10 through openings 102 into the hollow space through which it flows.

The inner sleeve part 13 includes a two-part pedestal 131, 132 (which can also be in one piece), a jacket 133 and a lid 135 (which are adhesively bonded together). The lower pedestal part 131 lies on the table 10. The fuel gas (with the admixing of air for the partial oxidation) is fed through a line 3 into a reformer which is located within the multi-component sleeve at the level of the upper pedestal part 132. The air of the hollow space passes through radial passages 134 in the jacket 133 to a further unit 4 which is described below with reference to FIGS. 3 to 7. On passing through the passages 134 the air takes up further heat from the inner sleeve part 13. In the region of the passages 134 the inner sleeve part 13 is locally formed as active thermal insulation. The process air is further heated up in the unit 4 before it enters into the fuel cells. During afterburning in the unit 4 the air becomes a component of an exhaust gas. The exhaust gas enters into axial collecting channels and flows to the pedestal of the unit 4 where it passes through radial passages into an axial centrally arranged outlet passage. Exhaust gas 30a is discharged from this outlet passage into the lower part of the plant 1 (see FIG. 2). The axial collecting channels can also lead directly into the lower part of the plant 1, i.e. without being led together into a common outlet passage.

Figure 2:
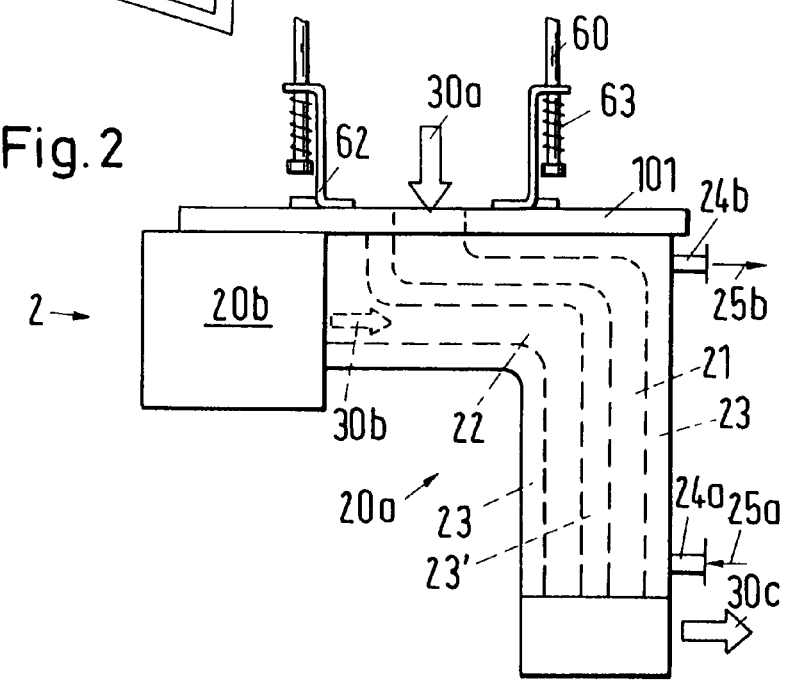
FIG. 2 shows a heat exchanger for heating purposes such as is provided for the plant in accordance with the invention.

In FIG. 2 a heat exchanger 20a of heating apparatus 2 is shown which is arranged in the lower part of the plant 1 directly below the table 10. A metallic plate 101, which advantageously can be comprised of aluminium, is a component of the table 10. The fuel cell battery 11 is secured to the plate 101 via a clamping device 6 for the cell stack 5 so that heat from the hot multi-component sleeve is directed to the heat exchanger acting as a heat sink, and so that a temperature which is sufficiently low for springs is present at the base of the clamping device 6. A gas heating system 20b is provided as an additional heating system for covering peaks of the heat requirement (e.g., on cold winter days) or to cover the heat requirement in summer when the fuel cells are not in operation.

Figure 5:
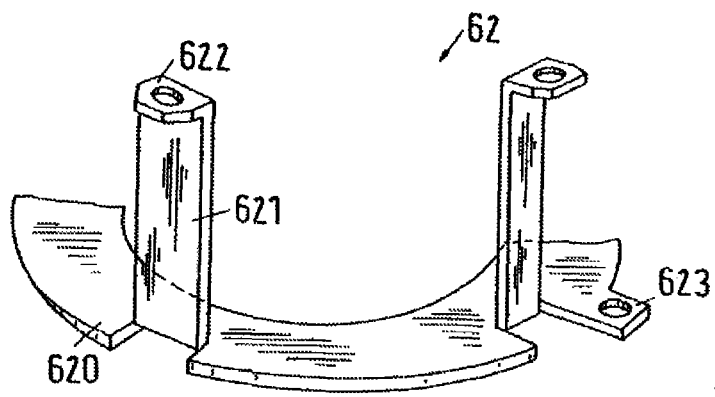
FIG. 5 shows a lower end of the clamping device.
Figure 6:
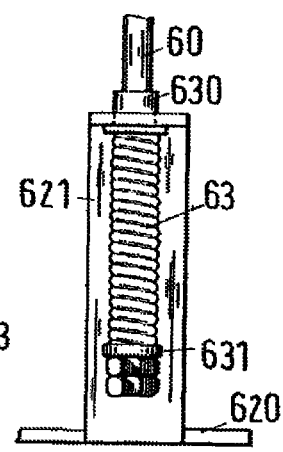
FIG. 6 shows a compression spring of the clamping device which brings about clamping forces.

As shown in FIGS. 4 to 6, the clamping device 6 includes clamping bars 60 which are arranged between the afterburning chambers. A clamping element 62 of the clamping device 6 is in heat conducting connection with the heat exchanger. Compression springs 63 are mounted on the clamping bars 60, in each case between one end of the clamping bars 60 and a lug of the clamping element 62. In this respect they exert a clamping force onto the clamping bars 60. The compression springs 63 are screened by the clamping element 62 relative to the cell stack so that, due in part to the heat sink, the compression springs 63 are exposed only to moderate temperatures and the clamping force is retained. The clamping device 6 is composed of a clamping plate 61, the clamping bars 60, the clamping element 62 and also the compression springs 63. The cells of the stack are pressed against one another between the clamping plate and the clamping element 62.

The heat exchanger 20a includes two separate passages 21 and 22 within a double walled jacket 23, which, together with a partition wall 23' between the channels 21, 22, forms a unitary component through which a heat carrier medium flows. This component is connected to a heating plant for a room heating system (also for hot water heating) by connection to a stub 24a for a return line 25a and to a stub 24b for a feed line 25b of the heating plant. In the first passage 21 the hot exhaust gas 30a transmits heat to the heat carrier medium. In addition, in the second passage 22, a second gas, the combustion gas 30b of the gas heating system 20b, gives up heat to the heat carrier medium. The combustion gas 30b flows at a pressure greater than the environmental pressure through the heat exchanger 20a, whereas the pressure of the exhaust gas 30a is smaller because it is pumped with a suction fan 15 (see FIG. 8). The cooled gases (arrow 30c) are discharged to the environment through a chimney 16 (see FIG. 8).

FIG. 3 shows the unit 4 which forms the innermost part of the multi-component sleeve. This unit 4 which directly surrounds the cell stack 5 has an outer wall 40 with the function of a corset-like cage. The unit 4 includes axially directed chambers 7 for the afterburning (see FIGS. 4 and 7). Between the periphery of the stack 5 and the outer region of the sleeve (parts 12, 13) there is a construction which fixes the chambers 7. This construction includes the corset-like cage 40, the cross-section of which lying perpendicular to the stack axis has essentially the shape of a regular polygon (here with four corners). An afterburning chamber 7 is associated with each corner of this polygon. Radial spring forces act respectively from the corners on the associated chamber 7. Details will be described further below with reference to FIG. 7. The air which flows in through the passages 134 of the sleeve part 13 is deflected in a second hollow space (not shown) towards the corners of the cage 40 where it flows through holes 400 into the interior of the unit 4.

The unit 4 is closed at the top end by a lid 45. Leaf springs 64 in the form of downwardly bent metal strips are arranged in the corners of the cage 40. These leaf springs 64 are respectively inserted through two slots 640 in the wall of the cage 40 so that they are active as an elastic fastener means for the lid 45. At the bottom the unit 4 there is a three-part pedestal 41a, 41b, 42 which corresponds to the pedestal 131, 132 of the sleeve part 13. The cage 40 is releasably and elastically secured by clamps 65 to the central pedestal part 41b. The reformer to which the gas line 3 leads is disposed in the upper pedestal part 42. A sleeve for the reformer forms, together with a horizontal gas duct section 3', in an advantageous embodiment, a monolithic piece of a ceramic material which has the form of a "tobacco pipe." The reformer, which is advantageously a cylindrical honey-comb body with a catalytic surface coating is inserted into the head of this "tobacco pipe" (with seals between the outer wall of the honeycomb-body and the inner wall of the sleeve). A radiation protection means can also be incorporated in the "tobacco pipe" so that the gas temperature in the base does not get to high. The clamping element 62 with the compression spring 63 is arranged in the lower pedestal part 41a. The clamping element 62 is screwed to the plate 101 of the table 10 (see FIG. 2) at the lugs 623.

The lid 45 serves on the one hand as heat insulation. On the other hand, it presses the afterburning chambers 7 downwardly for the purpose of fixing them. For this contact pressure additional clamping means can be provided beneath the lid 45 which act on the chambers 7 individually. Ceramic pins can also be provided for the pressure on the afterburner chambers 7, the pins being guided through the lid 45 and the leaf springs 64 acting on them. A further possibility for the fixation is to screw the chambers 7 on in the pedestal region.

FIG. 4 shows the upper end of the clamping device 6 for the cell stack 5 which is formed from a stable plate (i.e. the clamping plate 61). Two clamping bars 60 have heads 60' anchored in bores of the clamping plate 61. The connector bars connect this plate 61 to the clamping element 62 which is shown in more detail in FIG. 5. A thermally and electrically insulating plate 50 is arranged between the clamping plate 61 and the cell stack 5 and is terminated at its upper end by a current collector 51. A current conducting bar 51a conducts the electrical current picked up in the current collector 51. FIG. 4 also shows the upper end of three afterburning chambers 7, the fourth of these chambers 7 has been omitted.

The clamping plate 61 can also have a different shape from that shown in FIG. 4. Thus, for example, it can also be of beam-like shape. The material from which the clamping plate 61 is to be manufactured must remain stable at the high temperatures which occur in the vicinity of the hot cell stack 5. A metallic alloy or a ceramic material such as silicon nitride, for example, may be used for the material.

FIGS. 5 and 6 show the clamping element 62 which forms the lower element of the clamping device 6. The compression spring which brings about a clamping force is attached to a lug 622 which forms the head end of a yoke 621. This yoke 621 starts at a ring 620 (only one half shown), which is secured to the plate 101 of the table 10 by at least two lugs 623. The clamping bar 60 is pushed into a sleeve 630 at the lug 622. The compression spring 63 is disposed between a lower ring disc 631, which is held against downward movement by two nuts, and the sleeve 630. Due in part to the heat dissipation through the yoke 621 to the ring 620 and from there to the plate 101 and also to the heat exchanger 20a, the compression spring 63 never becomes impermissibly hot (e.g., greater than 300° C.) so long as the heat exchange medium of the heat exchanger 20a exerts a cooling action. The clamping action exerted by the compression springs 63 on the clamping rods 60 therefore does not weaken.

Figure 7:
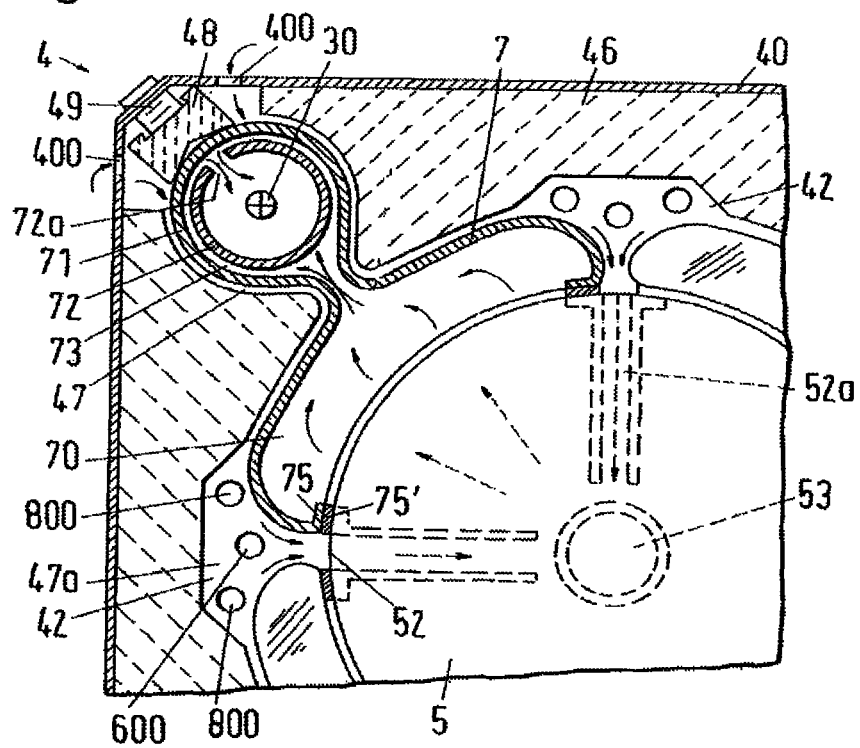
FIG. 7 shows a cross-section through the part shown in FIG. 3.

FIG. 7 shows a partly drawn cross-section through the unit 4 shown in FIG. 3. Radial forces act from the four corners of the corset-like cage 40 on the four afterburning chambers 7. The chamber 7 has an outer wall 71 and includes a trough-like afterburning chamber 70 which has a closed edge as a sealing edge 75. The sealing edge 75 is pressed by the radial spring force onto a sealing strip 75' between chamber 7 and stack 5. The trough-like space 70 is connected via a narrow passage 73 to an axial collecting passage 72 for exhaust gas 30. This collecting passage 72 is disposed between the trough-like space 70 and the corner of the corset-like cage 40.

The corset-like cage 40 has the shape of a four-cornered prism. The corners are blunt (i.e. the form of these corners results from cutting away a triangle from a pointed corner). The radial spring forces can be generated with strips 48 which lie on the afterburner chambers 7 and leaf springs 49. The leaf springs 49 are suspended in slots 490 in the blunt corners. The strips 48 preferably consist of a ceramic material which is a poor conductor of heat. The leaf springs 49 are thus protected from the high temperature of the afterburning chamber 7.

The axial collecting passage 72 forms, together with a region of the outer chamber wall 71, the narrow passage 73 or a part of the narrow passage 73. The narrow passage 73 largely has the shape of a ring gap. The collecting passage 72 has an elongated gap 72a which serves as a passage for exhaust gas 30 from the narrow passage 73 into the collecting passage 72. The cross-section of the afterburning chamber 7, including the collecting passage 72, is of mirror-symmetry. The axis of symmetry lies on the bisector of the angle which is spanned by the corset-like cage 40 at the corner.

Filling bodies 46 are arranged between the corset-like cage 40 and the afterburner chambers 7. Gap-like passages 47 are disposed between the filling bodies 46 and the surfaces of the chambers 7. These gap-like passages 47 lead from the corners along the chamber wall 71 to air entry points 52 of the cell of the stack 5. The chambers 7 and the filling bodies 46 are respectively manufactured of a material which is resistant to high temperatures and transmits heat well (e.g., a metal or a ceramic material such as silicon carbide, steatite, etc.) and from a ceramic material which conducts heat poorly.

As described herein, the fuel cell includes a PEN element and an interconnector. The interconnector, which separates a space for the air from a space for the combustion gas, has a relief-like profile through which the flow of air is deflected in a special manner. The air passes through radial passages 52a from the air entry points 52 into a central region and from there along the PEN element back to the periphery. At the other side of the PEN element the reformed fuel gas (containing CO and $H_2$) flows from a central passage 53 which extends along the axis of the cell stack 5 to the periphery. The two radially outward flowing gas flows (process air and combustion gas) mix in the afterburning chambers 70 where the non-reacted fuel residues are burned. The exhaust gas 30 which arises flows on further to the collecting passages 72. Due in part to the narrow passages 73 the flow is largely directed horizontally. A vertical outflow first takes place in the collecting passages 72. Practically no heat is transmitted from the collecting passages 72 to the air to be heated in the passages 47, so that practically no axial temperature gradients are formed. Thus, the problem of unfavorable axial temperature gradients associated with known fuel cell battery plants is solved.

Due in part to the elastic fixation resulting from the construction with the corset-like cage 40, the problematic seal between the stack and chamber walls associated with known fuel cell battery plants is improved. In addition to the elastic fixation of the lid 45 at the cage 40, a construction is present which results in a compensation of dimensional inaccuracies resulting from differential thermal expansion behavior of the diverse components.

The filling bodies 46 have at their center a recess through which a vestibule 47a always remains open before the air entry points 52. In FIG. 7, one is looking from within the vestibule 47a onto the surface of the pedestal part 42. There, two holes 800 and a hole 600 can be seen. The hole 600 exists for the clamping rod 60 of the clamping device 6 or of the current conducting rod 51a. Heating rods or tubular heating bodies (not shown) are guided through the holes 800 which are required for starting up the plant. To ensure that the same flow conditions preferably arise in all vestibules 48 a "dummy rod" is additionally used. Only one current conducting rod 51a is required and two positions are available for it. The "dummy rod" is associated with the extra position.

Figure 8:
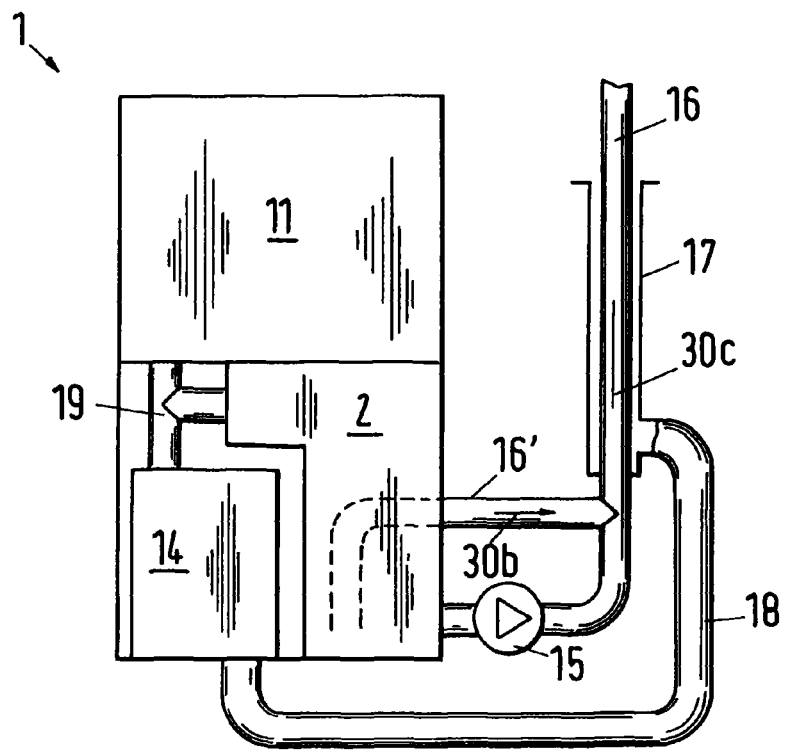
FIG. 8 shows a schematic illustration of the plant of the invention and its connection to a chimney.
Figure 9:
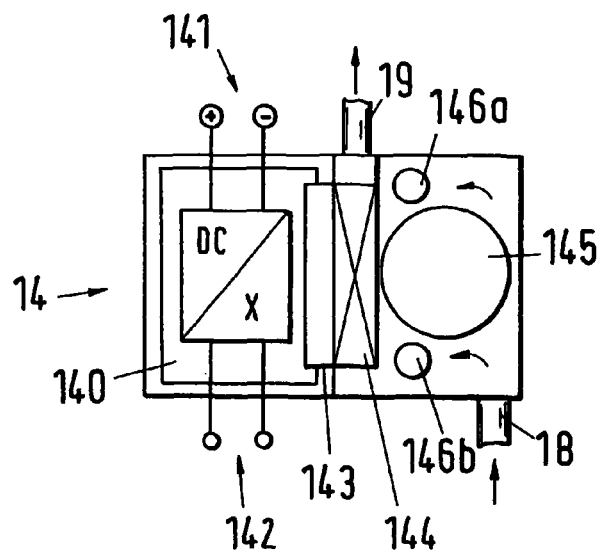
FIG. 9 is a schematic illustration of an electronic apparatus having an electronic power circuit which is installed in the plant of the invention for the purpose of control and electrical conversion.

FIG. 8 shows a schematic representation of the plant 1 of the invention and its connection to a chimney 16 through which the exhaust 30c is transmitted to the environment. Fresh air is sucked in from the environment via a sleeve tube 17 and is preheated at the surface of a lower region of the chimney 16. The fuel cell battery 11 is mounted on the heating apparatus 2. An electronic apparatus 14 with electronic power system (see FIG. 9) is connected to an induction tube 18 for air, through which a connection is established to the sleeve tube 17. After the air has passed through the electronic apparatus 14 it enters through a distribution tube 19 into the fuel cell battery 11 and, optionally, when additional heating has been set in operation, into the gas heater 20b (see FIG. 2). A suction fan 15 conveys the exhaust gas 30a of the fuel cell battery 11 into the chimney 16. Exhaust gas 30b of the gas heater 20b passes through a separate duct 16' into the chimney 16. A second fan or a ventilator for the additional heating is not shown. FIG. 9 shows a schematic representation of the electronic apparatus 14 which is incorporated in the plant 1 of the invention for the purpose of controlling and electrical transformation using a converter 140. In the converter 140, two inlet poles 141 are connected to the fuel cell battery 11, and a DC current is converted into a transformed current or a useful voltage X, which is preferably an alternating voltage. The useful voltage X is applied via two output poles 142 to a consumer (e.g., as an electrical power supply). The air sucked in through the tube 18 flows around a transformer 145 and further components 146a, 146b (for example diodes, filters, current smoothing chokes, etc.), and finally flows between ribs of a cooling body 144 to the distribution tube 19. The cooling body 144 dissipates lost heat from elements 143 of the electronic power system.

The overall efficiency of the plant 1 is improved by the special air guidance since the heat loss which arises through the electrical conversion is dissipated to the process air. The zones which are to be cooled are designed such that the pressure loss of the air flow is as small as possible and the cooling action on the named components or elements is as large as possible. Due in part to the forced cooling (as compared to a natural convection) the cooling body 144 can be made relatively small. When a maximum of electric power is generated with the fuel cell battery 11, the air through-flow and consequently the performance of the forced cooling are also at a maximum. This cooling has a self-regulating behavior such that if the power of the fuel cell battery 11 is reduced, then the air requirement reduces accordingly while ensuring that the cooling remains sufficient to dissipate the reduced heat loss.

The invention claimed is:

1. A plant comprising a stack of high temperature fuel cells and a multi-component sleeve surrounding the stack, the sleeve including a plurality of axially directed afterburning chambers, wherein a construction which fixes the afterburning chambers is arranged between the periphery of the stack and an outer region of the sleeve,
wherein the construction includes a part, the outer wall of which forms a cage having a cross-section perpendicular to the stack axis which has essentially the shape of a regular polygon,
wherein each of the plurality of afterburning chambers are arranged in respective corners of the polygon,
wherein radial spring forces respectively act from the corners onto the associated afterburning chambers and thereby press sealing edges of the afterburning chambers onto sealing strips between the afterburning chambers and the stack,
wherein the afterburning chambers each comprise a trough-shaped space and the sealing edges are closed edges of the trough-shaped space,
wherein each trough-shaped space is connected via a respective narrow passage to a respective axial collecting passage for exhaust gas, and
wherein each collecting passage is arranged between the respective trough-shaped space and the respective corner, and
wherein the radial spring forces are produced by strips and springs, wherein the strips lie on the afterburning chambers, and wherein the springs are arranged in the corners.

2. The plant in accordance with claim 1, further comprising:
filling bodies disposed between the cage and the afterburning chambers; and
gaps disposed between the filling bodies and the surfaces of the afterburning chambers which form passages leading from the corners along the trough-shaped spaces to air entry points of the cells,
wherein the chambers and the filling bodies are respectively manufactured of a material which conducts heat well and which is resistant to high temperatures and of a ceramic material which conducts heat poorly.

3. The plant in accordance with claim 2, wherein clamping bars of a clamping device for the cell stack, heating bars, current conducting bars, and/or dummy bars are disposed between the periphery of the stack and the filling bodies in front of the air entry points of the cells.

4. The plant in accordance with claim 1, wherein the regular polygon is four-sided, and wherein the corners are substantially blunt.

5. The plant in accordance with claim 1, wherein the springs are leaf springs suspended in slots in the corners, and wherein the strips comprise a ceramic material which conducts heat poorly.

6. The plant in accordance with claim 1, wherein each axial collecting passage forms the respective narrow passage with a region of a respective outer chamber wall or forms a part of the narrow passage, wherein the narrow passage is of ring-gap shape, and wherein the collecting passage has a longitudinal gap which serves as a passage for exhaust gas from the narrow passage into the collecting passage.

7. The plant in accordance with claim 1, wherein the cross-section of each afterburning chamber, including the collecting passage, is of mirror symmetry, and wherein, in the installed state, the axis of symmetry lies on the bisector of the angle which is spanned by the cage in the associated corner.

8. The plant in accordance with claim 1, wherein the collecting passages of the afterburning chambers open directly or indirectly into a heat exchanger which is adapted to obtain thermal energy for heating purposes, wherein a second passage is integrated into the heat exchanger for combustion gasses from an auxiliary burner, and wherein a top side of the heat exchanger is a carrier for the multi-component sleeve.

9. The plant in accordance with claim 8, wherein the collecting passages of the afterburning chambers open into radial passages of the sleeve below the cell stack, wherein the passages meet centrally in an axial outlet passage for the exhaust gas, and wherein the outlet passage opens into the heat exchanger.

10. The plant in accordance with claim 1, further comprising a lid at the upper end of the cage, wherein further leaf springs are arranged in the corners of the cage and are respectively suspended in two slots in a wall of the cage, and wherein the further leaf springs elastically attach the lid to the cage.

* * * * *